March 24, 1970     W. L. HABLE ET AL     3,501,961
GAS SAMPLE COLLECTION APPARATUS
Filed Nov. 4, 1968
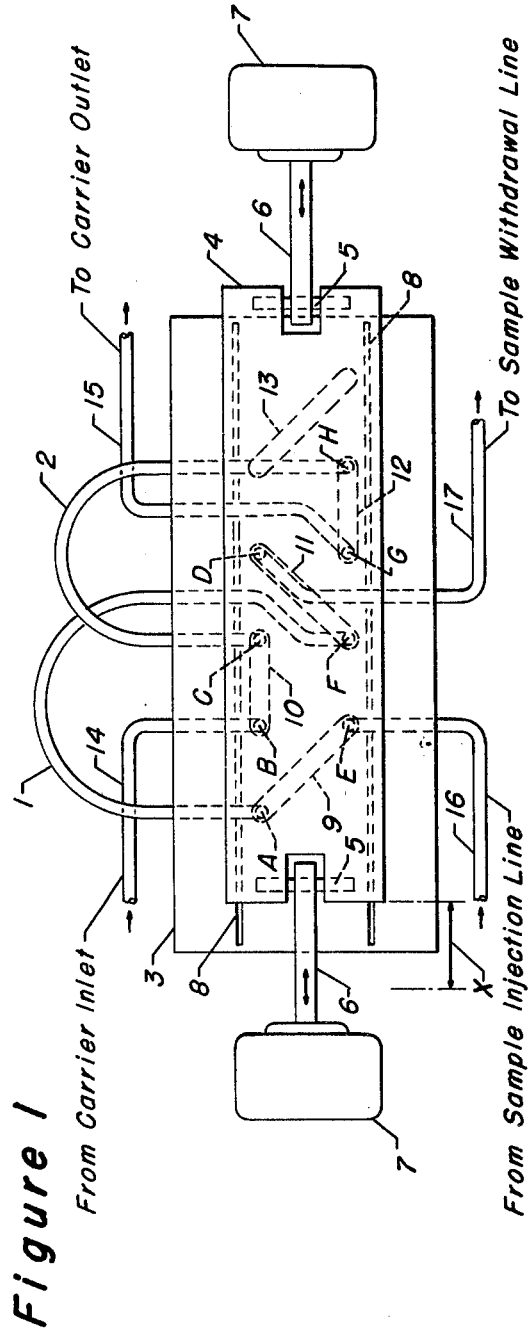
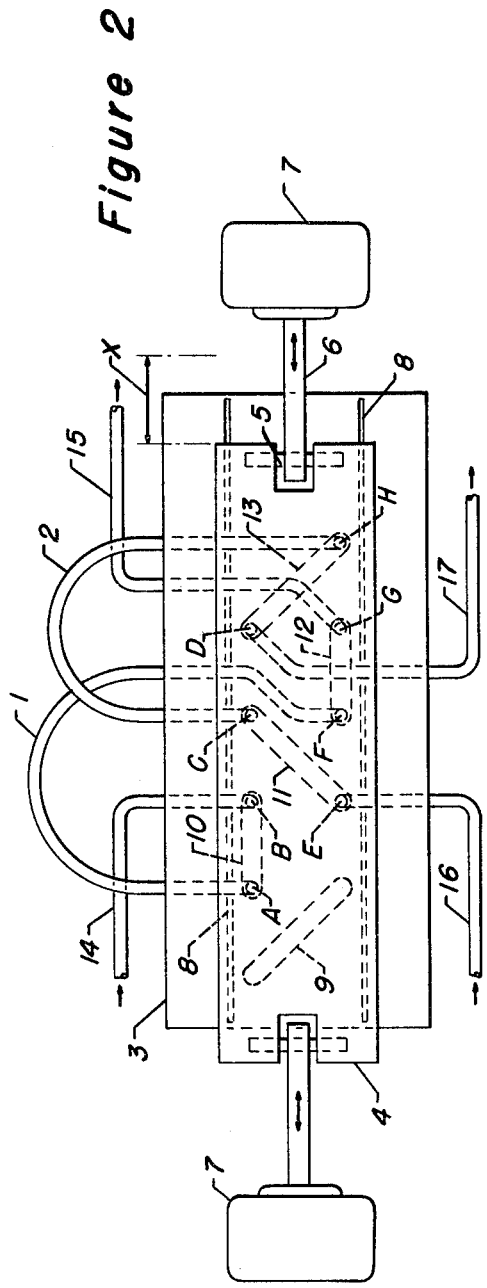
INVENTORS
William L. Hable
Elwin S. Bitney
BY: *James R. Hoatson, Jr.*
*Philip J. Liggett*
ATTORNEYS United States Patent Office 3,501,961
Patented Mar. 24, 1970

3,501,961
GAS SAMPLE COLLECTION APPARATUS
William L. Hable and Elwin S. Bitney, Bloomer, Wis., assignors to Universal Oil Products Company, Des Plaines, Ill., a corporation of Delaware
Filed Nov. 4, 1968, Ser. No. 773,207
Int. Cl. G01n 1/10, 1/22
U.S. Cl. 73—421.5      5 Claims

ABSTRACT OF THE DISCLOSURE

A gas sample collection apparatus comprising two sample collection loops connected to the first of two body members of a gas sample valve body. The two body members of the gas sample valve body are in slideable contact and positionable in two relative positions. The first body member has passageways therethrough, and the second body member has channels which interconnect the aforesaid passageways in different sequences for each of the two relative positions, whereby alternately one sample collection loop is filled with sample gas while previously collected sample gas is carried from the other sample collection loop.

---

This invention relates to a gas sample collection apparatus comprising two sample collection loops connected to the first of two body members of a gas sample valve body. The two body members are in slideable contact and positionable in at least two relative positions. The first body member has passageways therethrough, and the second body member has channels which interconnect the aforesaid passageways in different sequences for each of two of the relative positions, whereby alternately one sample collection loop is filled with sample gas, while the sample gas in the other sample collection loop is carried to an analyzing instrument. More particularly, the first body member of the gas sample valve body has several passageways sequentially spaced along and perpendicular to a first line in a direction of sliding. Along this first line on the first body member there is a first sample collection loop inlet passageway connected to the first sample collection loop, a carrier gas inlet passageway leading from a carrier line, a second sample collection loop inlet passageway connected to the second sample collection loop, and a sample withdrawal passageway leading back to a sample line. Similarly spaced and positioned along a second line in the aforesaid direction this first line on the first body member there is a first the sample line, which is the source of the sample, a first sample collection loop outlet passageway connected to the first sample collection loop, a carrier gas outlet passageway leading back to the carrier line, and a second sample collection loop outlet passageway connected to the second sample collection loop. The second body member of the gas sample valve body has five channels which interconnect the passageways of the first body member in an alternative sequence in each of two relative positions of the body members. In the first relative position of the two gas sample valve body members, gas passes from a gas sample line to the first sample collection loop and back to the gas sample line, thereby filling the first sample collection loop with sample gas. Simultaneously, the second sample collection loop is connected to a carrier gas line, whereby a volume of sample gas previously collected in the second sample collection loop is entrained with a carrier gas and carried from the second sample collection loop to a gas analyzing instrument. In the second relative position of the two gas valve body members, the connections are reversed and the second collection loop fills with the sample gas while the sample gas collected in the first sample gas collection loop is passed to the analyzing instrument.

This invention is particularly suitable for use in conjunction with flame ionization detectors, particularly hydrogen flame ionization detectors, as well as other types of chromatographic gas analyzers. Any type of chromatographic gas analyzer requires accurate control of the sample flow rate to the detector or analyzing instrument. Normally, the gas sample is pumped from the sample line into the chromatographic gas analyzer with the pump outlet being pressure controlled. The rate of sample flow is then controlled by a fixed restrictor, such as a length of capillary tubing. The fact that close flow regulation is vital often necessitates a pump being used upstream from the analyzer to positively force the sample gas into the analyzer, rather than allowing a back pressure pump to draw sample gas into the analyzer. In many sample gases, a portion of the detectable gas or vapor usually has a high enough boiling point so that condensation of this high boiling point vapor tends to occur in the sample pump and in the sample lines. Heating the pump to eliminate condensation thereby becomes necessary.

An alternative manner of regulating flow in conventional chromatographic gas analyzing systems involves the use of a rotating valve to effect intake and exhaust of a sample gas. Such a rotating valve is operated by an electric solenoid which transmits linear motion. Additional equipment is necessary to transfer this linear motion of the electric solenoid to rotational motion in order to operate the rotational valve.

It is an object of the present invention to eliminate the necessity of regulating the flow of the sample gas to a controlled rate through the use of a pump. Since the flow regulating feature of the pump is eliminated, a back pressure pump can be employed thereby eliminating the problem of heating a pump through which sample gas must flow prior to being analyzed.

It is a further object of this invention to provide a sample collection apparatus which eliminates the need for any intermediate equipment necessary to change linear motion to rotational motion in order to operate a valve.

In a broad aspect this invention is a gas sample collection apparatus comprising first and second sample collection loops, and a gas sample valve body having first and second body members constructed to slideably contact each other and positionable in first and second relative positions, said first body member having sequentially spaced along a first line in a direction of sliding and perpendicular to the direction of sliding, the following passageways: a first sample collection loop inlet passageway connected to said first sample collection loop; a carrier gas inlet passageway; a second sample collection loop inlet passageway connected to said second sample collection loop; a sample withdrawal passageway; and similarly spaced and possitioned along a second line in the aforesaid direction sliding, the following passageways; a sample injection passageway; a first sample collection loop outlet passageway connected to said first sample collection loop; a carrier gas outlet passageway; a second sample collection loop outlet passageway connected to said second sample collection loop; and said second body member having first, second, third, fourth, and fifth channels therein, and in said first relative position, said first channel connects said first gas collection loop inlet passageway to said sample injection passageway, said second channel connects said carrier gas inlet passageway to said second sample collection loop inlet passageway, said third channel connects said first sample loop outlet passageway to said sample withdrawal passageway, and said fourth channel connects said carrier gas outlet passageway to said second sample collection loop outlet passageway, whereby sample gas is collected in said first sample collection loop and is carried from said second sample collection loop, and in said second relative position, said second channel connects said first gas collection loop inlet passageway to said carrier gas inlet passageway, said third channel connects said sample injection passageway to said second sample collection loop inlet passageway, said fourth channel connects said first sample collection loop outlet passageway to said carrier gas outlet passageway, and said fifth channel connects said sample withdrawal passageway to said second sample loop outlet passageway, whereby sample gas is collected in said second sample collection loop and is carried from said first sample collection loop.

The gas sample valve body of this gas collection sample apparatus has one fixed body member and one body member which slides across a surface of the fixed member. In the operation of the gas sample collection apparatus, the sliding body member is in a first position relative to the fixed body member. In this position, the sample gas from a sampling point is drawn into the first sample loop by the suction of a sample pump downstream from the invention in the sample line. The sample flow rate can be at any rate as long as it completely fills the sample loop before the valve switches. The carrier gas in the carrier line at this time forces the sample out of the second sample collection loop at a given rate and delivers it to the detector or analyzer. After a given interval, which is controlled by an electric timer, an electric solenoid moves the second or sliding gas valve body member to the second relative position with respect to the first or fixed gas valve body member and the second loop is filled with sample gas while the sample gas in the first sample collection loop is carried to the detector.

Close pressure regulation by a pump is unnecessary in any chromatographic gas analyzer using this invention because the quantity of gas being analyzed in any case is closely regulated in another way by this invention. That is, the quantity of sample gas in any particular cycle of the analyzer will always be the same where the volume of each sample collection loop is identical because each sample collection loop during collection will always be at the same pressure, that is, the ambient pressure in the sample line. In some chromatographic gas analyzers, the standardization of the quantity of sample gas analyzed is critical, and the sample collection loops must be matched in volume and rigidly constructed to insure a fixed volume at the ambient sample pressure during each collection cycle. In other types of chromatographic gas analyzers, such as flame ionization detectors, the quantity of sample is not critical and need not be uniform with each cycle, as in this type of analyzer the measurements of combustible gases are recorded as a percentage of each sample analyzed.

The term sample collection loop, as used herein, is not restricted in a geometric sense, but is construed as encompassing any closed passageway leading and returning to the gas sample valve. A sample collection loop can be a single or several coils of tubing, an enclosed chamber, or any other cavity through which gas freely flows in which there are no pockets in which gas may become trapped.

The sample gas inlet and the sample gas withdrawal may be mere branches to the gas sample collection apparatus from a separate sample gas line. Preferably, however, the entire sample stream travels from the sample gas inlet tube through the gas sample collection apparatus and out through the gas sample withdrawal tube. In this preferred arrangement, the sample gas will completely flush out each sample collection loop during that portion of the cycle when each sample collection loop is filled with sample gas.

The various features of the gas sample collection apparatus are further illustrated in the accompanying drawings in which:

FIGURE 1 is an elevational view of the gas sample collection apparatus in which the two body members of the gas sample valve are in a first relative position with respect to each other.

FIGURE 2 is an elevational view of the gas sample collection apparatus in which the two body members of the gas sample valve are in a second relative position with respect to each other.

Referring now to FIGURE 1, there is shown a gas sample collection apparatus comprising a first sample collection loop 1, a second sample collection loop 2, and a gas sample valve body having a first body member 3 and a second body member 4. Body members 3 and 4 are constructed to slideably contact each other. Body member 3 is equipped with two parallel tracks 8 which extend in the direction of sliding and into which mating protuberances (not shown) extend from the surface of body member 4 which contacts body member 3. Body member 4 is thereby held in contact with body member 3 as it moves slideably along tracks 8 between a first relative position as shown in FIGURE 1 and a second relative position as shown in FIGURE 2. The distance of travel of body member 4 relative to body member 3 is indicated by a distance X in both FIGURE 1 and FIGURE 2. As illustrated, body member 3 is fixed and body member 4 is slideably positionable with respect to fixed body member 3 and body member 4 is moved by electric solenoids 7 which are controlled by an electric timer (not shown). Arms 6 extend from electric solenoids 7, and pins 5 pass through transverse holes in arms 6 and rest in accommodating indentations in body member 4, thereby connecting body member 4 to solenoids 7.

Perpendicular to and sequentially spaced along a first line in the direction of sliding on first body member 3 are the following passageways: a first sample collection loop inlet passageway A, connected to first sample collection loop 1; a carrier gas inlet passageway B connected to the carrier line by inlet tube 14; a second sample collection loop inlet passageway C, connected to the second sample collection loop 2; and a sample withdrawal passageway D, connected to sample line by withdrawal tube 17.

Similarly spaced and positioned along a second line in the aforesaid direction of sliding on body member 3 are the following passageways: a sample injection passageway E, connected from the sample line by injection tube 16; a first sample collection loop outlet pasageway F connected to the first sample collection loop 1; a carrier gas outlet passageway G, connected to the carrier line by outlet tube 15; and a second sample collection loop outlet passageway H, connected to second sample collection loop 2.

The first sample collection loop inlet passageway A, the carrier gas inlet passageway B, the second sample collection loop inlet passageway C, and the sample withdrawal passageway D are spaced at equal distances along the aforesaid first line. Likewise sample injection passageway E, first sample collection loop outlet passageway F, carrier gas outlet passageway G, and second sample collection loop outlet passageway H are spaced at equal distances along the aforesaid second line. In the preferred embodiment, as illustrated, the distance of spacing of the passageways along the first line is equal to the distance of spacing of the passageways along the second line.

Gas sample valve body member 4 has a first channel 9, a second channel 10, a third channel 11, a fourth channel 12, and a fifth channel 13. The lengths of the second channel 10 and the fourth channel 12 equal the distance of passageway spacing along the first and second lines in the direction of sliding. The vectorial component in the direction of sliding of the lengths of the first channel 9, the third channel 11, and the fifth channel 13, equals the distance of passageway spacing along the first and second lines in the direction of sliding. The vectorial component perpendicular to the direction of sliding of the lengths of first channel 9, third channel 11, and fifth channel 13 equals the distance between the aforesaid first and second lines.

In the first relative position of gas valve body members 3 and 4, as illustrated in FIGURE 1, first channel 9 connects first gas collection loop inlet passageway A to sample injection passageway E. Second channel 10 connects carrier gas inlet passageway B to second sample collection loop inlet passageway C. Third channel 11 connects first sample loop outlet passageway F to sample withdrawal passageway D. Fourth channel 12 connects carrier gas outlet passageway G to second sample collection loop outlet passageway H. Through these connections gas is collected in first sample collection loop 1 and is carried from second sample collection loop 2 to the gas analyzing instrument.

In the second relation position of the gas valve body members 3 and 4, as illustrated in FIGURE 2, second channel 10 connects first gas collection loop inlet passageway A to carrier gas inlet passageway B. Third channel 11 connects sample injection passageway E to second sample collection loop inlet passageway C. Fourth channel 12 connects first sample collection loop outlet passageway F to carrier gas outlet passageway G. Fifth channel 13 connects sample withdrawal passageway D to second sample collection loop outlet passageway H. By these connections gas is collected in second sample collection loop 2 and is carried from first sample collection loop 1 to the analyzing instrument.

In the operation of the gas sampling apparatus, solenoids 7 slide gas valve body member 4 into the first relative position with respect to gas valve body member 3. Sample gas then flows from the sample gas line through injection tube 16, through passageway E, channel 9, passageway A, and into the first sample collection loop 1, thereby flushing out any carrier gas remaining in first sample collection loop 1 and filling sample collection loop 1 with sample gas. The gas flow proceeds from sample collection loop 1 through passageway F, channel 11, passageway D, and into withdrawal tube 17 which returns the gas to the sample line. Simultaneously, carrier gas flows from inlet tube 14, leading from the carrier gas line, through passageway B, channel 10, passageway C, and into sample collection loop 2. The carrier gas entrains the sample gas previously collected in sample collection loop 2 and carries it to the gas analyzing instrument by passing through passageway H, channel 12, passageway G, and outlet tube 15 which leads to the carrier gas line and the analyzing instrument. At a timed interval, solenoids 7 shift gas valve body member 4 to the second relative position with respect to gas valve body member 3. In this position, sample gas flows from the sample line through injection tube 16, passageway E, channel 11, passageway C, and into second gas collection loop 2. The carrier gas is thereby flushed from sample collection loop 2 and the gas flow proceeds through passageway H, channel 13, passageway D, and into withdrawal tube 17 which leads back to the sample line. At the same time, carrier gas passes from the carrier line to inlet tube 14, through passageway B, channel 10, passageway A, and into sample collection loop 1, thereby entraining sample gas previously collected. The gas flow travels from the sample collection loop 1 through passageway F, channel 12, passageway G, and back into the carrier gas line through outlet tube 15. After the time interval as determined by the electric timer, electric solenoids 7 shift gas valve body member 4 back to the first position relative to gas valve body member 3, and the cycle is repeated throughout the duration of the gas analyzing process.

All the sequential distances between passageways A, B, C, and D and passageways E, F, G, and H are shown to be equal in the drawings. This is the preferred arrangement merely for convenience of manufacture and is not a restriction necessary to the operation of the invention. There are some distance limitations that do exist in this invention. One such restriction is that the distance between passageways C and D is equal to the distance X, which is the distance between the first and second relative positions in the direction of sliding. If these distances were not equal, the upper end of channel 11 would not provide a connection for both passageway D and passageway C in the first relative position and the second relative position respectively. For the same reason the distance between passageways E and F must equal the distance X. Also, the channels which extend longitudinally in the direction of sliding must be at least as great as the distances to be spanned. That is, the length of channel 10 must be greater than or equal to both the distance between passageways A and B and the distance between passageways B and C. Likewise, the length of channel 12 must be greater than or equal to both the distance between passageways F and G and the distance between passageways G and H. Similarly, the vectorial components of the channels in the direction of sliding for the channels which are not linear with respect to the direction of movement must equal the longitudinal distance to spanned in the direction of sliding. More particularly, the length component of channel 9 in the direction of sliding must equal the longitudinal distance between passageways A and E, and the length component of channel 11 in the direction of sliding must equal both the longitudinal distance between passageways E and C and that between passageways F and D. In connection with this restriction, the longitudinal distance between passageways E and F must equal the longitudinal distance between passageways C and D.

The channels 9, 10, 11, 12 and 13 are illustrated in the drawings as open grooves on the inner face of gas valve body member 4. In an alternative form, these channels may be internal passageways within gas valve body member 4 which appear at the inner face of body member 4 only at the two locations which are necessary to interconnect the passageways as heretofore described. The limitations of distance between these two appearances are the distance limitations previously described. In no case do the channels open on any surface of gas valve body member 4 other than that which is in contact with gas valve body member 3.

Tracks to engageably hold gas valve body member 4 to gas valve body member 3 are not critical to the operation of this invention, although it is necessary that gas valve body member 4 and gas valve body member 3 be in contact so that closed passageways are formed for gas flowing therebetween.

This invention may be modified so that the fixed gas sample valve body member contains the connecting channels and the sliding gas sample valve body member has the aforesaid passageways therethrough, without affecting the functioning of this invention. Also, there may be additional possible relative positions of the body members without adversely affecting the use of the invention. One such additional relative position is an intermediate one wherein there is no gas flow through the gas sample collecting apparatus.

The foregoing detailed description of the preferred embodiment and the descriptions of some of the possible modifications of this invention have been given for clearness of understanding only, and no unnecessary limitation should be construed therefrom as modifications will be obvious to those skilled in that art.

We claim as our invention:

1. A gas sample collection apparatus comprising first and second sample collection loops and a gas sample valve body having first and second body members constructed to slideably contact each other and positionable in first and second relative positions, said first body member having sequentially spaced along a first line in a direction of sliding and perpendicular to the direction of sliding, the following passageways:

(a) a first sample collection loop inlet passageway connected to said first sample collection loop, (b) a carrier gas inlet passageway, (c) a second sample collection loop inlet passageway connected to said second sample collection loop, (d) a sample withdrawal line passageway, and similarly spaced and positioned along a second line in the aforesaid direction of sliding, the following passageways:
(e) a sample injection line passageway,
(f) a first sample collection loop outlet passageway connected to said first sample collection loop,
(g) a carrier gas outlet passageway,
(h) a second sample collection loop outlet passageway connected to said second sample collection loop,
and said second body member having first, second, third, fourth, and fifth channels therein, and in said first relative position, said first channel connects said first gas collection loop inlet passageway to said sample injection line passageway, said second channel connects said carrier gas inlet passageway to said second sample collection loop inlet passageway, said third channel connects said first sample loop outlet passageway to said sample withdrawal line passageway, and said fourth channel connects said carrier gas outlet passageway to said second sample collection loop outlet passageway, whereby sample gas is collected in said first sample collection loop and is carried from said second sample collection loop, and in said second relative position, said second channel connects said first gas collection loop inlet passageway to said carrier gas inlet passageway, said third channel connects said sample injection passageway to said second sample collection loop inlet passageway, said fourth channel connects said first sample collection loop outlet passageway to said carrier gas outlet passageway, and said fifth channel connects said sample withdrawal line passageway to said second sample loop outlet passageway, whereby sample gas is collected in said second sample collection loop and is carried from said first sample collection loop.

2. The gas sample collection apparatus of claim 1 further characterized in that said first sample collection loop inlet passageway, said carrier gas inlet passageway, said second sample collection loop inlet passageway, and said sample withdrawal line passageway are spaced at equal distances along the aforesaid first line, and said sample injection passageway, said first sample collection loop outlet passageway, said carrier gas outlet passageway, and said second sample collection loop outlet passageway are spaced at equal distances along said second line.

3. The gas sample collection apparatus of claim 2 further characterized in that the distance of spacing of said passageways along said first line is equal to the distance of spacing of said passageways along said second line.

4. The gas sample collection apparatus of claim 3 further characterized in that the lengths of said second channel and said fourth channel equal the distance of passageway spacing, and the vectorial component in the direction of sliding of the length of said first, third, and fifth channels equals the distance of passageway spacing, and the vectorial component perpendicular to the direction of sliding of the length of said first, third, and fifth channels equals the distance between the aforesaid first and second lines.

5. The gas sample collection apparatus of claim 1 further characterized in that said first body member is fixed and said second body member is slideably positionable with respect to said first body member and said second body member is moved by an electric solenoid controlled by an electric timer.

References Cited

UNITED STATES PATENTS

| | | |
|---|---|---|
| 3,116,642 | 1/1964 | Weir. |
| 3,150,517 | 9/1964 | Kuffer et al. |
| 3,162,050 | 12/1964 | MacDonald et al. |
| 3,347,269 | 10/1967 | Courneya et al. |
| 3,393,551 | 7/1968 | Todd et al. |

FOREIGN PATENTS 1,097,208  12/1967  Great Britain.

LOUIS R. PRINCE, Primary Examiner

H. C. POST III, Assistant Examiner

U.S. Cl. X.R.

73—422